(12) United States Patent
Markunas et al.

(10) Patent No.: US 6,967,461 B1
(45) Date of Patent: Nov. 22, 2005

(54) NORTH-SOUTH POLE DETERMINATION FOR CARRIER INJECTION SENSORLESS POSITION SENSING SYSTEMS

(75) Inventors: Albert L. Markunas, Roscoe, IL (US); John F. Defenbaugh, Rockford, IL (US); Michael Harke, Madison, WI (US); Charles Romenesko, Roscoe, IL (US); Daniel M. Saban, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 10/930,629

(22) Filed: Aug. 31, 2004

(51) Int. Cl.[7] .............................................. H02P 1/46
(52) U.S. Cl. ........................ 318/700; 318/723; 322/29
(58) Field of Search ............................... 318/720, 723; 322/29

(56) References Cited

U.S. PATENT DOCUMENTS

| | | | | |
|---|---|---|---|---|
| 4,808,903 A | * | 2/1989 | Matsui et al. ............... | 318/800 |
| 5,594,322 A | * | 1/1997 | Rozman et al. ............... | 322/10 |
| 5,760,359 A | * | 6/1998 | Nakano et al. ............. | 318/603 |
| 6,023,417 A | * | 2/2000 | Hava et al. .................... | 363/41 |
| 6,043,624 A | * | 3/2000 | Masaki et al. ............... | 318/723 |
| 6,555,988 B2 | * | 4/2003 | Masaki et al. ............... | 318/721 |
| 6,703,809 B2 | * | 3/2004 | Royak et al. ............... | 318/727 |
| 6,822,418 B2 | * | 11/2004 | Harke ........................ | 318/807 |
| 6,831,439 B2 | * | 12/2004 | Won et al. ................... | 318/701 |
| 6,831,440 B1 | * | 12/2004 | Royak et al. ............... | 318/727 |
| 6,894,454 B2 | * | 5/2005 | Patel et al. ................. | 318/700 |
| 6,927,551 B2 | * | 8/2005 | Yoshimoto ................... | 318/715 |
| 2001/0002784 A1 | * | 6/2001 | Masaki et al. ............. | 318/727 |

FOREIGN PATENT DOCUMENTS

JP        02071312 A  *  3/1990   ............ G05D 3/12

* cited by examiner

*Primary Examiner*—Burton Mullins
(74) *Attorney, Agent, or Firm*—Stephen G. Mican

(57) ABSTRACT

A system for enhancing the performance of a carrier insertion sensorless (CIS) position sensing system for a wound field synchronous machine that utilises the positively rotating components ($+2\omega_c t$) of the carrier second harmonic currents that contain rotor position information before field excitation to serve as a north-south pole indicator that determines if the CIS system has locked onto the north or south pole of the rotor.

12 Claims, 10 Drawing Sheets

NORTH-SOUTH POLE DETERMINATION FOR CARRIER INJECTION SENSORLESS POSITION SENSING SYSTEMS

FIELD OF THE INVENTION

The invention relates to rotor angular position and velocity sensing systems for dynamoelectric machines, and more particularly to an improved system for resolving the position of a rotor for a wound field synchronous machine using a carrier injection sensorless position sensing system at or near standstill.

BACKGROUND OF THE INVENTION

At rotor standstill or low speed there is insufficient back electromotive force (EMF) generated in a dynamoelectric machine to enable an accurate estimate of rotor position using only passive measurement of terminal potentials and currents. Some means must be provided to stimulate the machine in order to extract rotor position information. Many alternative schemes have been reported in the technical literature over the years.

Stimulation can be applied to either the rotor or the stator, it can be either transient or continuous, and it may be of different frequencies. Nonetheless, all the reported approaches require some means to stimulate the machine and some means to interpret or demodulate the stimulation response in order to provide an estimate of the rotor position. One advantageous approach is described in U.S. Pat. No. 5,585,709 by Jansen et al., herein incorporated by reference.

Jansen et al. describes a carrier injection sensorless (CIS) method of estimating the position and velocity of the rotor of a dynamoelectric machine. CIS works by applying a high frequency excitation signal with an electrical current or potential rotating waveform to the dynamoelectric machine at a high enough frequency that it sweeps around the stator faster than the rotor is turning, thus "viewing" the rotor from all angles. This "viewing" is manifested in measuring the resulting rotating current or potential waveform, which contains information about the rotor due to rotor position dependent differences in the equivalent magnetic circuit of the dynamoelectric machine.

If the rotating current waveform at the machine terminals is transformed to its stationary two axis equivalent ($\alpha\beta$) and x-y plotted, a non-circular orbit is seen that rotates with the rotor. This is the electromagnetic image of the dynamoelectric machine and in general, each machine has its own unique image. This technique works with any dynamoelectric machine that has rotor saliencies that result in a change in impedance as seen at the stator windings to the high frequency excitation signal.

Although the CIS technique described in Jansen et al. allows estimation of the position of a rotor pole, either "north" or "south", it does not inherently allow the determination of which pole's position is estimated. This could give rise to 180 electrical degree errors in position estimation, and such error can be very undesirable.

SUMMARY OF THE INVENTION

The saliency induced negative sequence current or potential waveforms caused by the carrier injection can only provide an estimate of twice the rotor electrical angle, that is, it determines the position of a pole, any pole, and not necessarily the north pole needed for proper motor operation. In order to determine true rotor position, some means must be provided to discriminate north from south. This means exists in the field current rectification provided by the rotating rectifier in the field circuit of the wound field synchronous machine. In essence, the rotating rectifier diodes produce an asymmetry in the effective d-axis impedance as viewed from the stator. The d-axis looks different when the rotating rectifier is forward biased than when it is reverse biased. This rectification induces second and higher order harmonics in the d-axis currents for carrier injection. This asymmetry only exists when the wound field synchronous machine is unexcited. As soon as excitation is applied, the rotating rectifier is forward biased, eliminating the asymmetry.

The invention utilises the positively rotating components ($+2\omega_c t$) of the carrier second harmonics that contain additional rotor position information before field excitation. This information is used as a north-south pole indicator to determine if the CIS system has locked onto a north or south pole of the rotor.

In the preferred embodiment, the invention comprises a north-south discriminator for discriminating between the north and south poles of a rotor for a polyphase alternating current (AC) wound field synchronous machine that has a power frequency representative of rotor angular velocity and current representative of torque and is driven by a control system that comprises a carrier injection sensorless (CIS) position sensing system that uses a polyphase AC carrier signal that has a frequency substantially higher than the power frequency applied to a stator of the machine whilst leaving the rotor unexcited, the rotor being excited by power generated by an exciter through a rotating rectifier, comprising: a polyphase AC to two phase stationary transformation for transforming polyphase second harmonic components of the carrier frequency signal to a two phase stationary reference frame to produce carrier second harmonic positively rotating components and negatively rotating components; a positive sequence carrier second harmonic transformation for transforming the carrier second harmonic rotating components into a positive sequence reference frame for the second harmonic of the carrier frequency; and a low pass filter for low pass filtering the transformed second harmonic components to generate north-south determination signal components representative of the position of the north pole of the rotor.

DETAILED DESCRIPTION OF THE INVENTION

Figure 1:
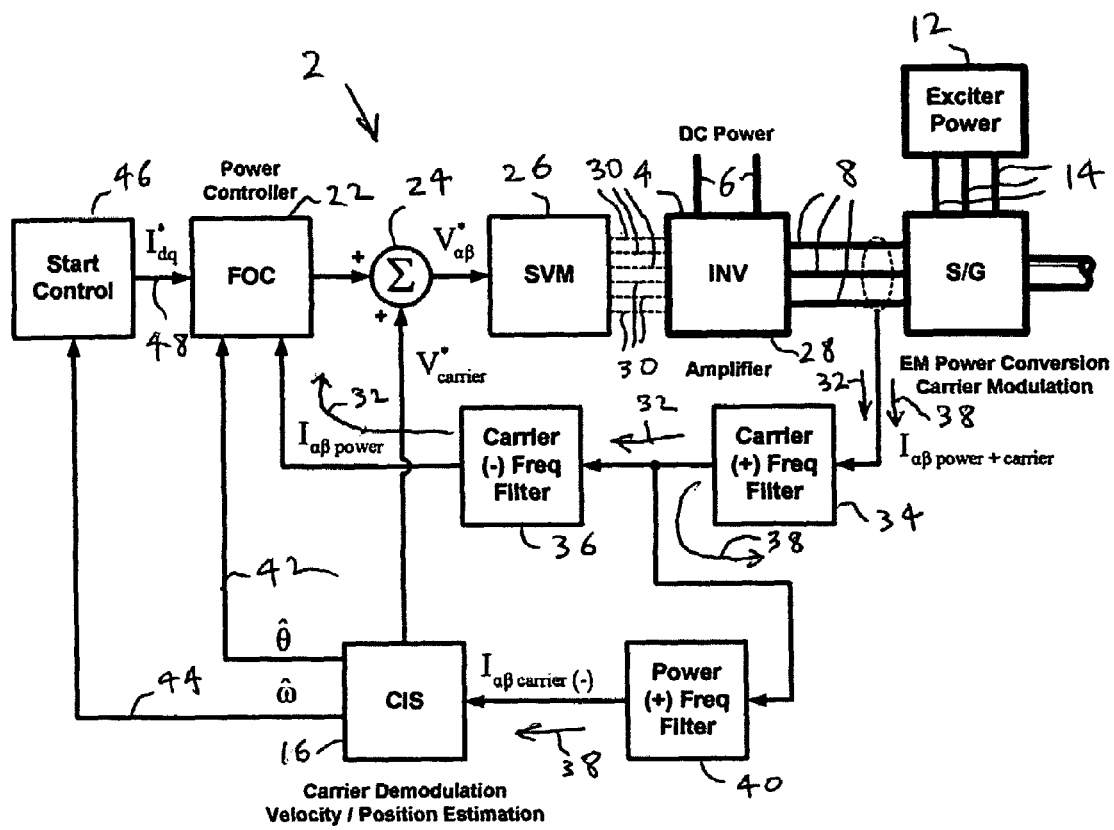
FIG. 1 shows a high level block diagram of a wound field synchronous machine control system 2 that uses a CIS algorithm.
Figure 2:
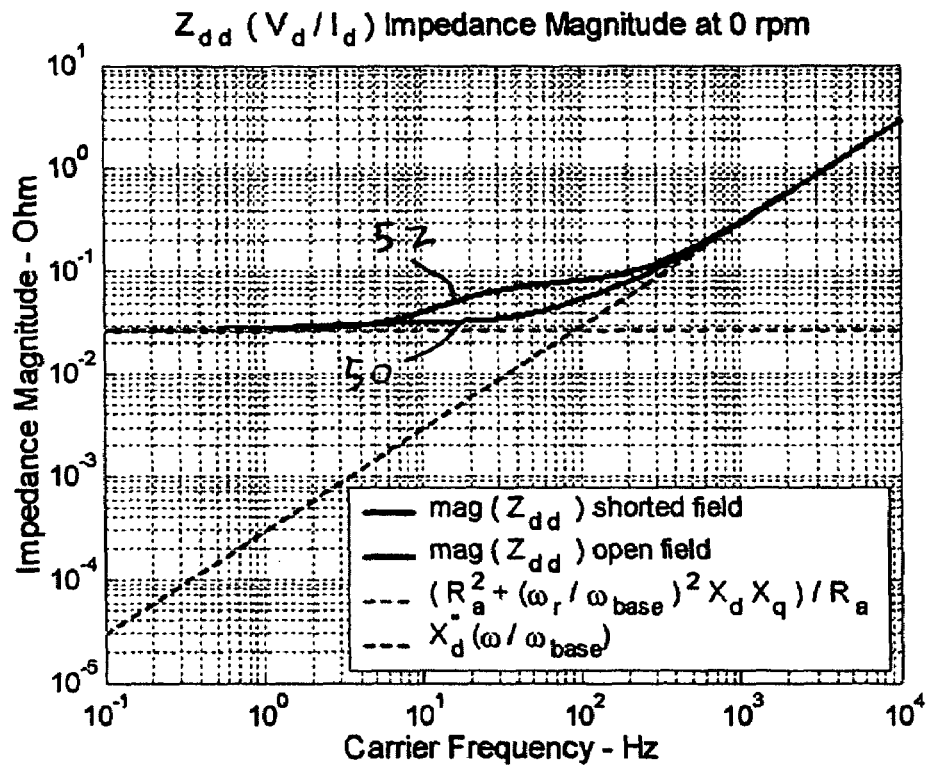
FIGS. 2 through 5 show gain and phase characteristics for the main diagonal elements of the impedance matrix of the CIS control for an exemplary 144/180 kVA 4-pole wound field synchronous machine.
Figure 3:
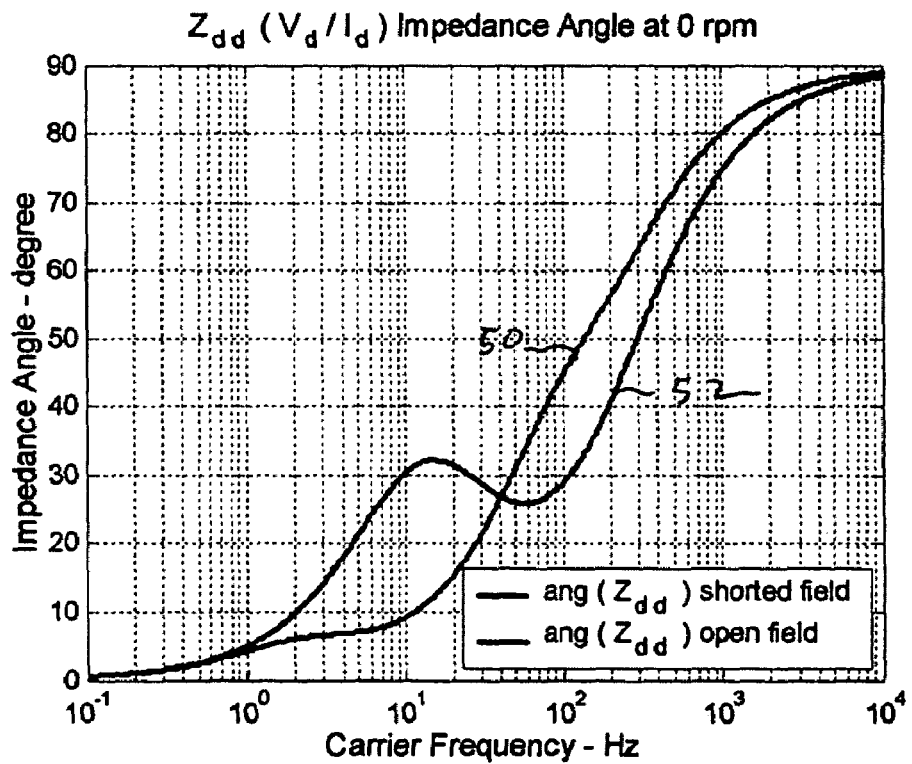
Figure 4:
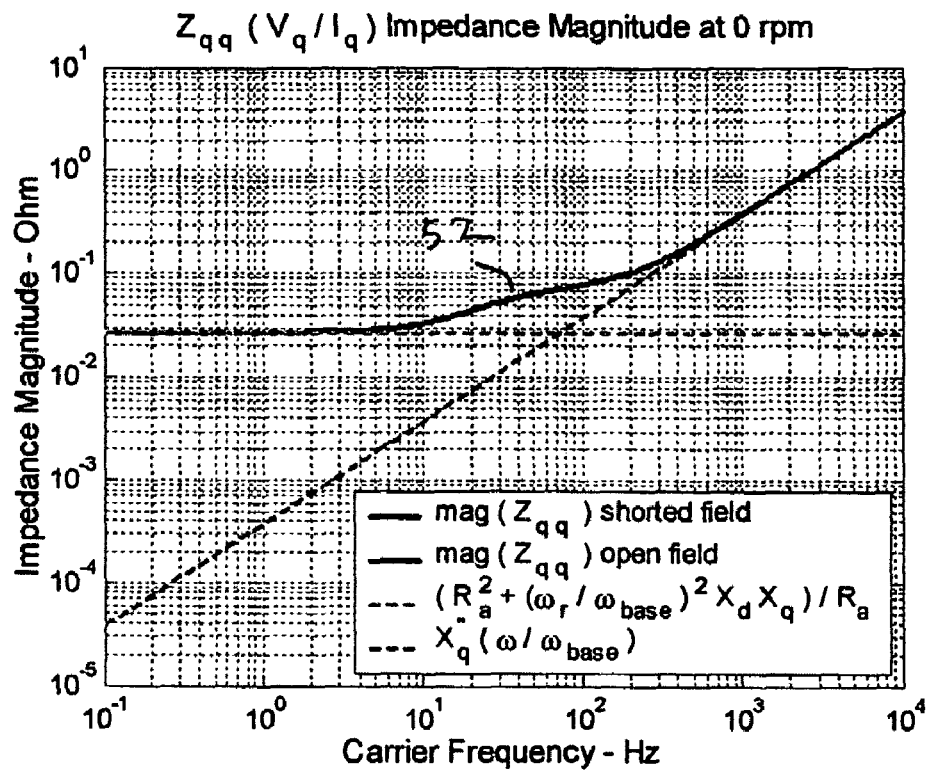
Figure 5:
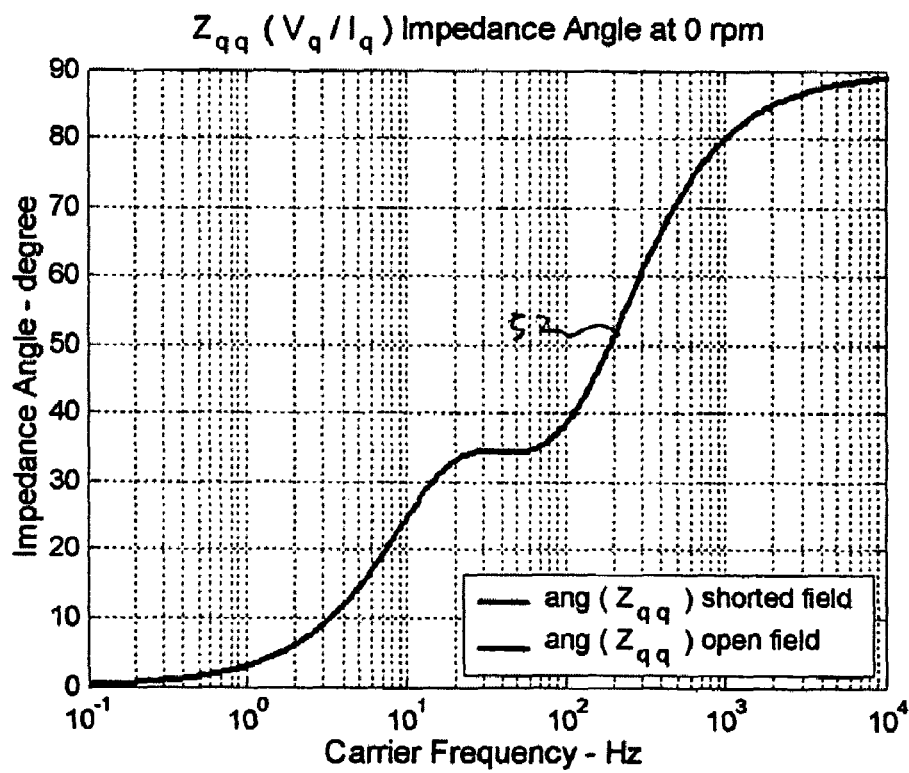

FIG. 1 shows a high level block diagram of a wound field synchronous machine control system that uses a CIS algorithm. Power processing blocks are shown in bold and signal processing blocks normal. A power inverter 4 converts direct current (DC) power provided on lines 6 to polyphase, typically three phase, alternating current (AC) power on lines 8 to drive a wound field synchronous machine 10, such as a motor or starter/generator. Exciter power for the machine 10 is provided by an excitation source 12 on lines 14. This diagram illustrates the use of carrier potential injection, although carrier current injection could also be used, and how the CIS algorithm fits nicely into the basic field oriented control (FOC) structure of modern motor control technology. A rotating carrier potential waveform generated by a CIS carrier demodulation and velocity/position estimation processor 16 on a signal path 18 is simply added by a summer 20 to potential commands generated by a FOC power controller 22 on a signal path 24 and the combined signal is sent on a signal path 26 to a space vector modulator (SVM) block 28 that drives the inverter 4 through signal lines 30. The wound field synchronous machine currents on the lines 8 are then measured and fed back in two distinctly different signal paths.

The top signal path, represented by arrows 32, is a torque producing current path or FOC current path and contains both positive sequence carrier frequency notch filter 34 and negative sequence carrier frequency notch filter 36 to eliminate all carrier frequency content. All carrier frequency content must be removed from the FOC path 32 since the accuracy of the CIS approach depends on precisely knowing the phase of the injected carrier potential waveform. If there is carrier frequency content in the FOC feedback, the FOC power controller 22 will act to suppress it. Since the FOC bandwidth may be on the order of several hundred Hz, the net carrier potential command following the summer 20 will be phase shifted from the reference carrier potential command, degrading the accuracy of the rotor position estimate.

The lower current feedback signal path, represented by arrows 38, is the carrier frequency path and contains fundamental power frequency filtering by a positive sequence power frequency notch filter 40, to eliminate the fundamental torque producing current content. The signals for the carrier frequency current feedback path 38 are taken after the carrier positive sequence notch filter 34, thereby eliminating the carrier positive sequence content as well as the fundamental torque producing current content.

In this configuration the wound field synchronous machine 10 not only provides fundamental electromagnetic (EM) power conversion, but also modulates the carrier frequency currents as a function of its rotor position. The CIS algorithm processor 16 extracts the rotor position information from the carrier frequency currents filtered by the power frequency filter 40 and provides estimates of wound field synchronous machine rotor position on a signal path 42 and velocity on a signal path 44 for use in the FOC 22. In FIG. 1, the velocity estimate is first directed to a start control processor 46 that provides a torque command signal to the FOC 22 through a signal path 48.

Machine Impedances—Saliency

The wound field synchronous machine 10 can be described in classic synchronous machine theory in the dq0 rotor synchronous reference frame as a set of five first order differential equations. This set of time domain equations can be Laplace transformed into the frequency domain. If only the imaginary part of the Laplace operator is considered, the resulting equations can be expressed in matrix impedance form. For the three-wire wound field synchronous machine connection in effect during start of the machine 10, this becomes the following 2×2 matrix impedance form relating stator dq potentials to stator dq currents:

$$\overline{Z}_{dq} \cdot \overline{I}_{dq} = \overline{V}_{dq}$$

or in admittance form:

$$\overline{I}_{dq} = \overline{Z}_{dq}^{-1} \cdot \overline{V}_{dq} = \overline{Y}_{dq} \cdot \overline{V}_{dq}$$

which can be expanded to:

$$\left\{ \begin{array}{c} \vec{I}_d \\ \vec{I}_q \end{array} \right\} = \begin{bmatrix} Y_{dd} & Y_{dq} \\ Y_{qd} & Y_{qq} \end{bmatrix} \cdot \left\{ \begin{array}{c} \vec{V}_d \\ \vec{V}_q \end{array} \right\}$$

The gain and phase characteristics for the main diagonal elements of the impedance matrix are shown in FIGS. 2 through 5 for exemplary 144/180 kVA 4-pole wound field synchronous machine design parameters, at 0 rpm, neglecting saturation. There are two solid lines shown on the d to d-axis plot, a line 50 for the machine field short circuit (rotating rectifier forward biased) and a line 52 for open circuit (reverse biased). As expected, the impedances look resistive at low frequencies and inductive at high frequencies. The impedance magnitudes asymptotically approach the respective subtransient reactances at high frequencies and the phases approach 90°.

Figure 6:
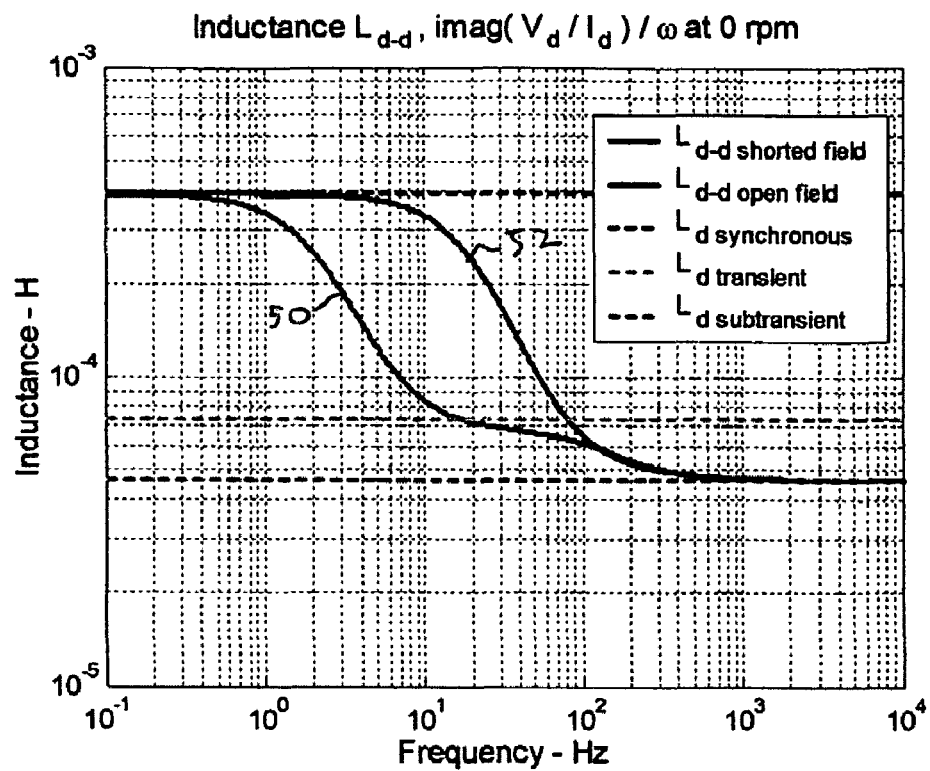
FIGS. 6 and 7 show the calculated inductance for the reactive portion of the main diagonal elements of the impedance matrix shown in FIGS. 2 through 5.
Figure 7:
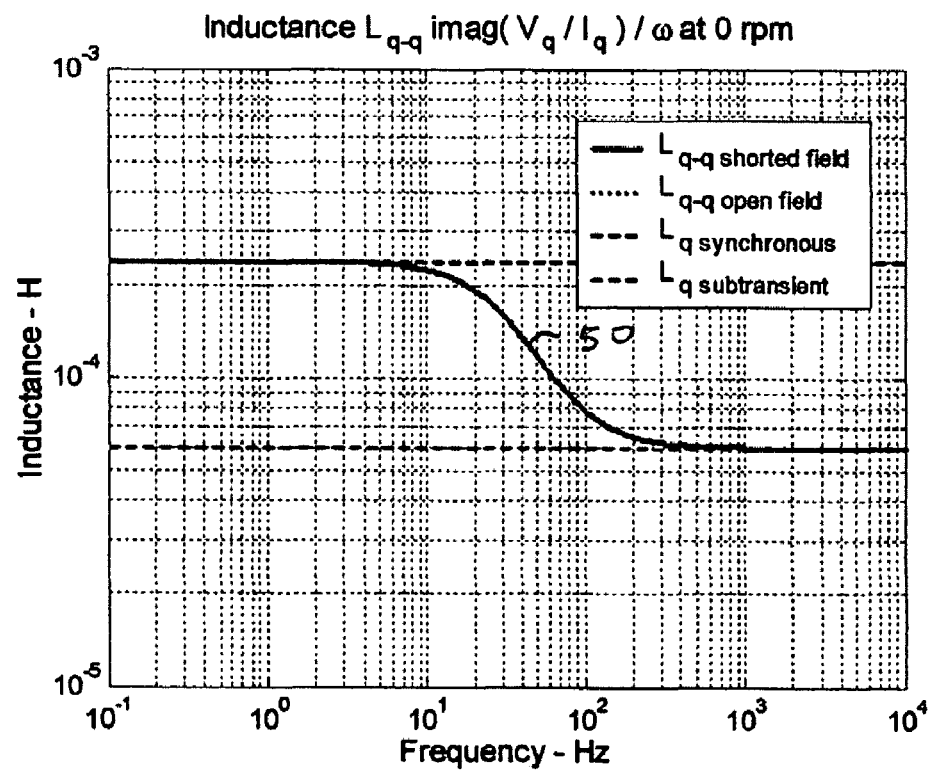
Figure 8:
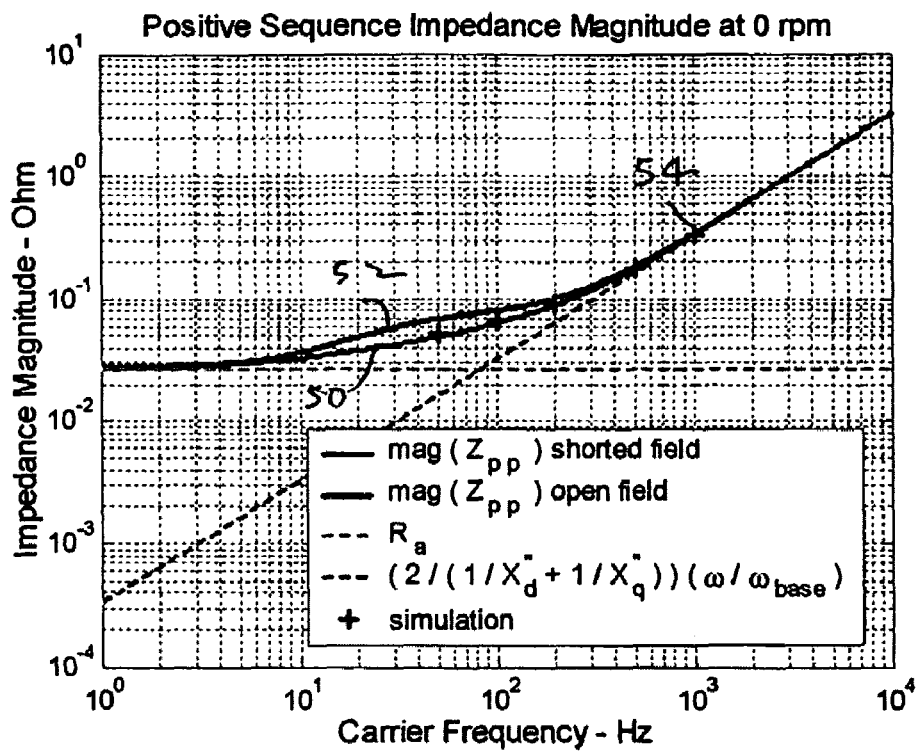
FIGS. 8 through 11 show the positive and negative sequence impedance gain and phase characteristics for the exemplary 144/180 kVA 4-pole machine design parameters.
Figure 9:
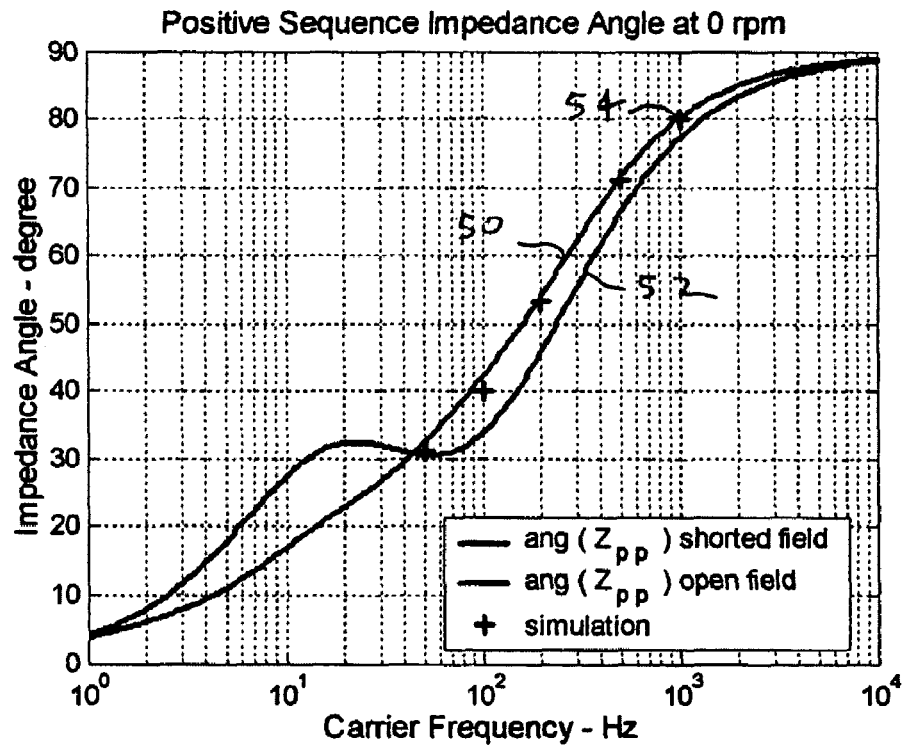
Figure 10:
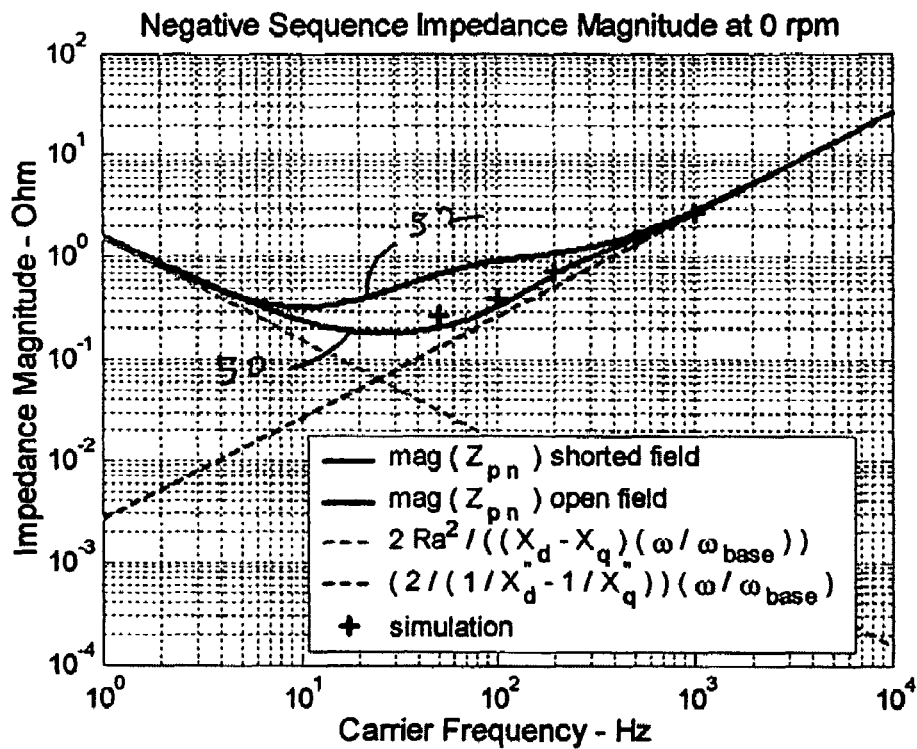
Figure 11:
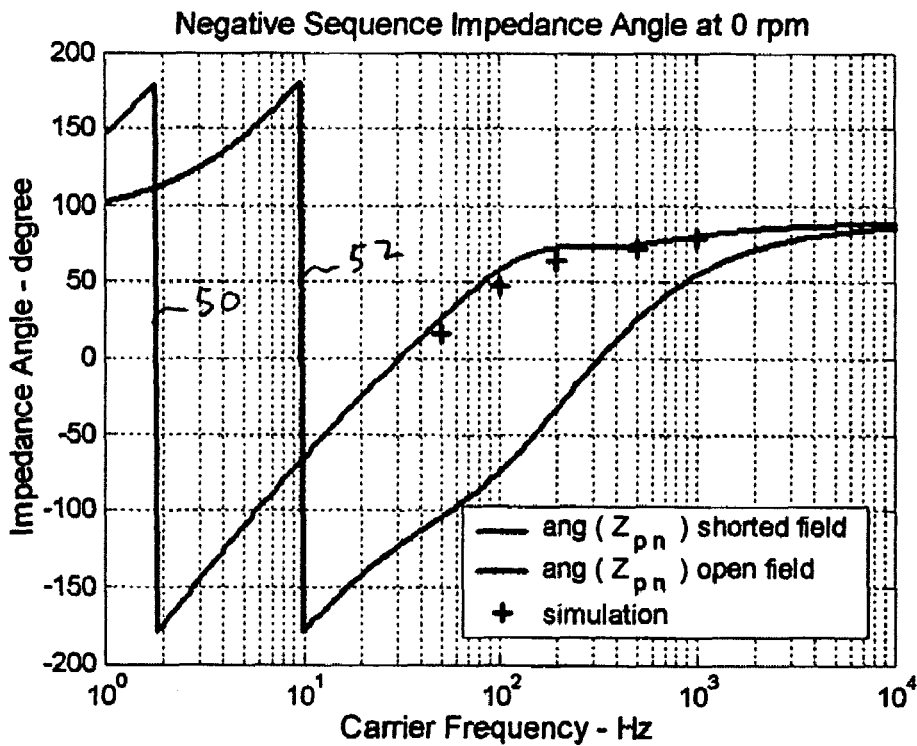

If only the reactive portion of these two impedances is considered and the inductance calculated (divide by ω) the results are shown in FIGS. 6 and 7. The d-axis self-inductance magnitude plot, FIG. 6, shows the progression from synchronous to transient to subtransient inductance. For the machine field open circuit there is no transient regime, as the field is essentially nonexistent. Of course, for the q-axis self-inductance plot there is no transient regime since there is no q-axis field winding.

If we assume the same positive sequence carrier potential as previously considered is applied to the wound field synchronous machine, that is:

$$v_\alpha = V_c \cdot \cos(\omega_c t)$$

$$v_\beta = V_c \cdot \sin(\omega_c t)$$

then the currents are given by:

$$i_\alpha = \frac{V_c}{|Z_p|} \cdot \cos(\omega_c t - \phi_p) + \frac{V_c}{|Z_n|} \cdot \cos(2\theta_r - \omega_c t + \phi_n)$$

$$i_\beta = \frac{V_c}{|Z_p|} \cdot \sin(\omega_c t - \phi_p) + \frac{V_c}{|Z_n|} \cdot \sin(2\theta_r - \omega_c t + \phi_n)$$

$$\phi_p = \tan^{-1}\{\mathrm{Im}(Z_p)/\mathrm{Re}(Z_p)\}$$

$$\phi_n = \tan^{-1}\{\mathrm{Im}(Z_n)/\mathrm{Re}(Z_n)\}$$

with:
$\omega_c$, =carrier frequency; (rad/sec)
$V_c$=carrier voltage magnitude; (V)
$\theta_r$=rotor electrical angle; (rad)
$Z_{p,n}$=positive, negative sequence impedances; (Ohm)
$\phi_{p,n}$=positive, negative sequence impedance angles; (rad)

and the positive and negative sequence admittances given by:

$$Y_p(\omega_c) = \frac{1}{2} \cdot \{Y_{dd}(\omega_c - \omega_r) - jY_{dq}(\omega_c - \omega_r) + jY_{qd}(\omega_c - \omega_r) + Y_{qq}(\omega_c - \omega_r)\}$$

$$Y_n(\omega_c - 2\omega_r) = \frac{1}{2} \cdot \{Y_{dd}(\omega_c - \omega_r) - jY_{dq}(\omega_c - \omega_r) - jY_{qd}(\omega_c - \omega_r) - Y_{qq}(\omega_c - \omega_r)\}$$

with:
$\omega_r$=rotor electrical frequency; (rad/sec)

The positive and negative sequence impedance gain and phase characteristics are given in FIGS. 8 through 11 for the exemplary 144/180 kVA 4-pole machine design parameters, at 0 rpm, neglecting saturation.

In the frequency range of 100 to 500 Hz, the predicted magnitude of the positive sequence impedance is about seven times the negative sequence, indicating that the negative sequence current magnitude will be about $\frac{1}{7}^{th}$ the positive sequence. The positive sequence impedance looks much like the d and q-axis impedances discussed previously, which makes sense since the positive sequence admittance is the average of the d and q-axis admittances (neglecting off diagonal terms). The impedance is resistive at low frequencies and inductive at high frequencies. Both open and short circuit field curves are included. The low and high frequency magnitude asymptotes are included for reference.

The character of the negative sequence impedance looks unusual. The negative sequence admittance is proportional to the difference between the d and q-axis self-admittances, which changes sign as frequency increases from dc. At low frequencies the pertinent impedances are the synchronous values, for which the d-axis value is larger than the q-axis value. The negative sequence admittance at low frequencies is given by:

$$Y_n = \frac{1}{2} \cdot \frac{-j(\omega_c - \omega_r)(L_d - L_q)}{(R_a + j(\omega_c - \omega_r)L_d)(R_a + j(\omega_c - \omega_r)L_q)}$$

which is non-minimum phase. The impedance magnitude initially decreases and the phase increases (from −270° initially) with increasing frequency, which is characteristic of a non-minimum phase system. At higher frequencies the impedance looks inductive. This is to be expected, as the pertinent impedances are the subtransient values, for which the q-axis is larger than the d-axis. The difference in admittances is positive, leading to the normal impedance behavior shown.

The plus marks 54 in FIGS. 8 through 11 represent results from simulation, which includes the action of the rotating rectifier in the wound field synchronous machine 10.

The carrier potential injection will induce potentials in the field winding due to transformer action. For the wound field synchronous machine 10 unexcited and with the rotating rectifier forward biased, field current will flow. For reverse bias, the field current will be negligible. The stator sees the field short circuit (forward bias) for part of a carrier potential cycle and open circuit (reverse bias) for the rest of the cycle. Thus, the effective positive and negative sequence impedances should lie between the two limiting cases of open and short circuit field, which the simulation points show.

The equations for the αβ currents show the positive and negative sequence currents and the phase of the negative sequence component relative to a negatively rotating carrier reference frame. The $2\theta_r$ term in the negative sequence clearly illustrates the rotor position information contained therein.

Rotor position information is contained in the phase relative to the negative sequence carrier reference frame, not in the amplitude. The negative sequence impedance angle must be known before a reliable estimate of twice the rotor electrical angle can be made. However, once this impedance angle is determined (from design parameters, refined by test), it can be programmed into the algorithm and will not differ appreciably from unit to unit.

One of the goals of CIS is to operate at a high enough frequency that the negative sequence impedance is nearly inductive, making the impedance angle nearly 90°, but more importantly making it insensitive to winding resistance temperature variations. Inductance is not affected by operating temperature and is a much more reliable parameter on which to base rotor position estimates.

The simplified equations for the αβ currents described above can be recovered from the more complete equation given here by the following substitutions:

$$\frac{1}{|Z_p|} = \frac{1}{2} \frac{1}{(\omega_c - \omega_r)} \left(\frac{1}{L_d} + \frac{1}{L_q}\right)$$

$$\frac{1}{|Z_n|} = \frac{1}{2} \frac{1}{(\omega_c - \omega_r)} \left(\frac{1}{L_d} - \frac{1}{L_q}\right)$$

$\phi_p = \pi/2$ $\phi_n = \pi/2$ for $L_d < L_q$ $\phi_n = -\pi/2$ for $L_d > L_q$ Synchronous Frame Filters As explained above, the CIS approach requires the selective elimination of harmonic content from the measured wound field synchronous machine currents. In the FOC current feedback signal path 32 both carrier positive and negative sequence currents are eliminated. In the CIS current feedback path 38 the carrier positive sequence and the fundamental positive sequence currents are eliminated. Synchronous frame notch filters 34, 36, 40 are used to provide this function.

Figure 12:
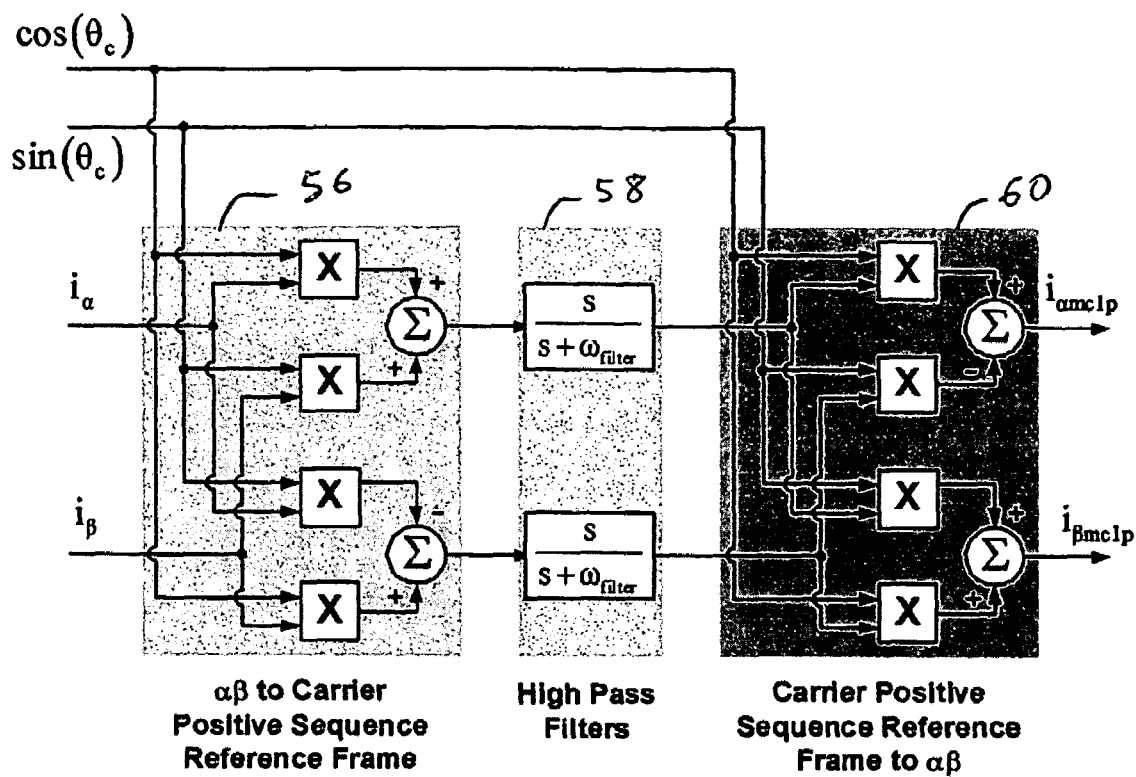
FIG. 12 shows the implementation of a synchronous frame carrier positive sequence notch filter.

FIG. 12 shows the implementation of a synchronous frame carrier positive sequence notch filter 34. The first step is to transform the αβ currents into the carrier positive sequence reference frame (rotating positively or counter clockwise at carrier frequency) by left shifting transformation processing block 56. Following this transformation, carrier positive sequence currents become DC. Another way of thinking about this transformation is that it constitutes a left frequency shift of $\omega_c$ in the frequency domain. The next step is to high pass filter the transformed currents through high pass filter blocks 58, eliminating all dc content. The last step is to transform the high pass filtered currents back to the stationary reference frame by right shifting transformation block 60.

Figure 13:
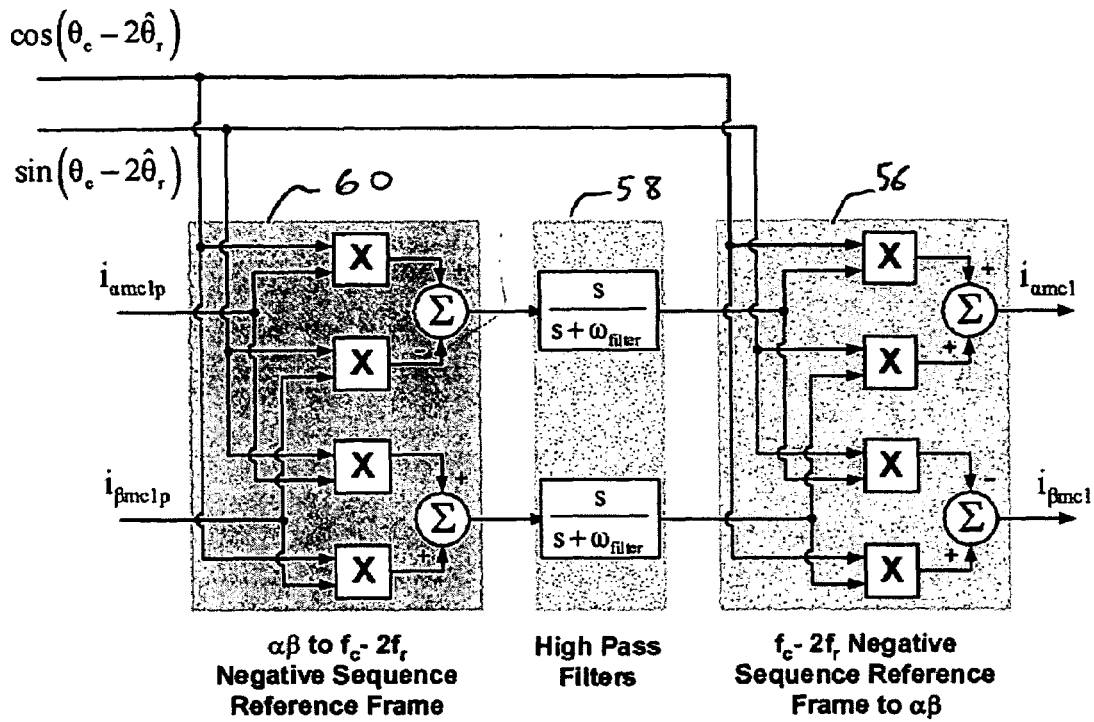
FIG. 13 shows the implementation of a synchronous frame carrier negative sequence notch filter.

This constitutes a right frequency shift of $\omega_c$ recovering all initial frequency content except for carrier positive sequence. The same concept is applied to the carrier negative sequence currents filtered by the carrier negative sequence notch filter 36 as shown in FIG. 13, except that the frequency shift is initially right by right shifting transformation block 60 followed by high pass filtering by high pass filter blocks 58, and finally frequency shift left by left shifting transformation processing block 56 to recover all initial frequency content except the negative sequence. The second difference is that the frequency shift is $\omega_c - 2\omega_r$ and not $\omega_c$, and that $\omega_r$ is the estimated value. Notice that the order of the left shifting reference frame transformation right shifting reference frame transformation in the carrier negative sequence notch filter 36 is reversed from that for the carrier positive sequence notch filter 34.

Figure 14:
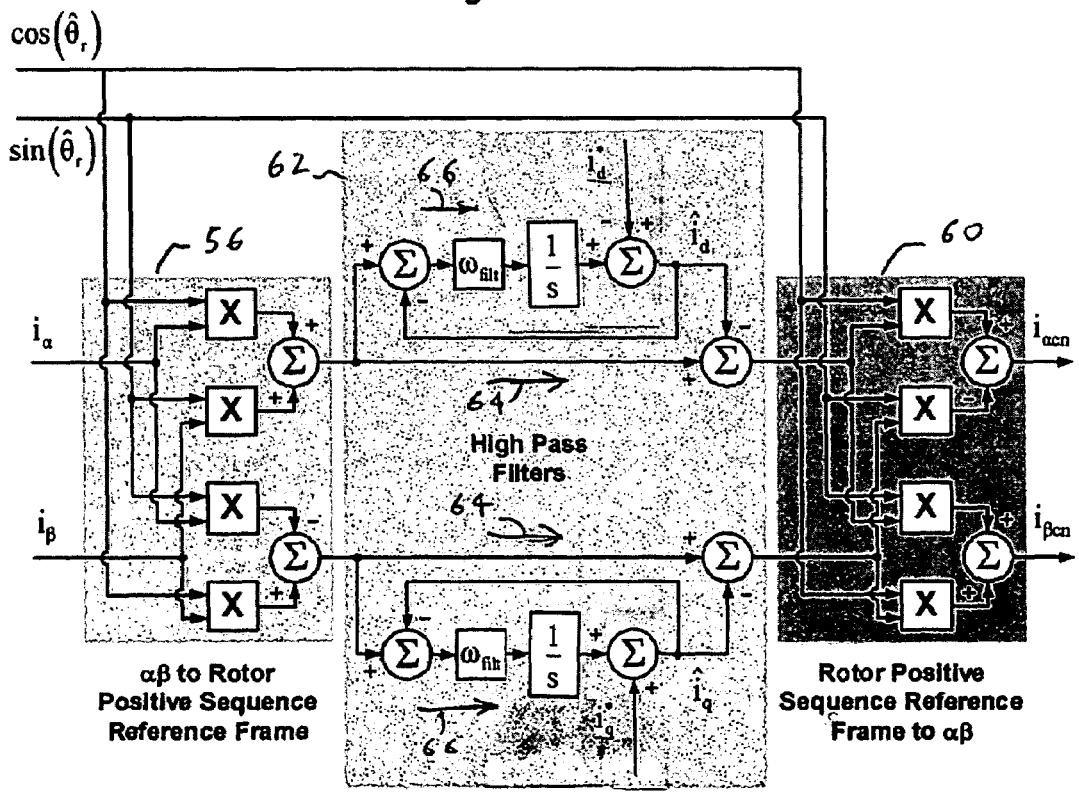
FIG. 14 shows the implementation of a fundamental positive sequence reference frame filter 40.

FIG. 14 shows the implementation of a fundamental positive sequence reference frame filter 40. The notch filter 40 is based on the same concept as the notch filter 34 described above, but it has been modified to make it track FOC commanded current changes with less error. The current commands into the FOC are initially commanded to zero to enable NS determination. Once the true rotor position has been determined and the machine excited, the FOC current commands are quickly increased to the values required for full torque. Without additional means to improve the tracking ability of the synchronous frame notch filter, good transient response (tracking) can only be achieved at the expense of frequency selectivity. In other words, the faster the notch filter tracking response, the wider the frequency notch becomes.

As shown in FIG. 14, the frequency shifting sections of the filter are exactly the same as for the carrier positive sequence notch filter 34, except that the frequency shift is estimated $\omega_r$ and not $\omega_c$. The real structural difference is in the formulation of high pass filters 62. The structure of high pass filters 62 has been decomposed into two parallel signal paths, a direct transmission path, represented by arrow 64, and a lagged path, represented by arrow 66. The signal from the lagged path 66 is subtracted from the direct transmission path 64 to realize the high pass filter 62. It is clear that the output of the lagged path 66 is an estimate of the fundamental torque-producing current, which is subtracted from the direct transmission path 64 to eliminate the fundamental frequency content.

The output of the $\omega_{filter}$ block is the error that drives the fundamental current observer. In a manner exactly analogous to that used for tracking observers, the FOC current command is fed forward and added to the observer error. Assuming that the FOC bandwidth is high relative to the frequency content in the FOC current commands, the fundamental current observer will track very well.

Phase Sensitive Demodulation

Figure 15:
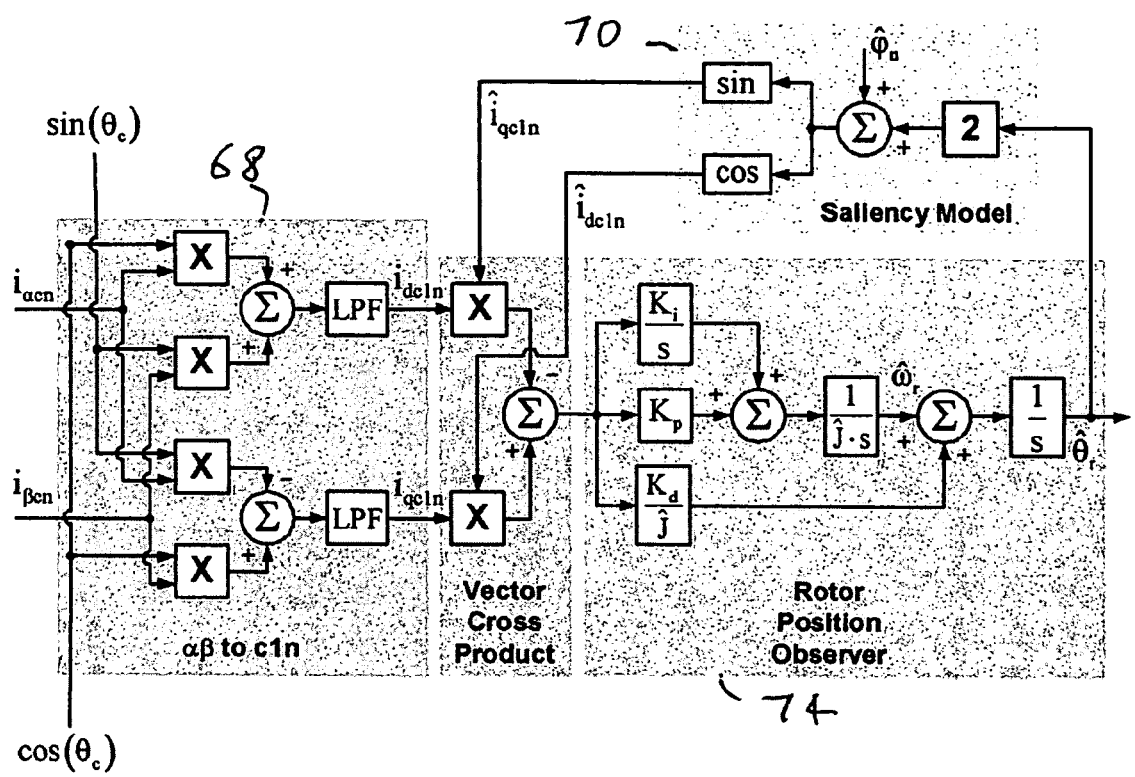
FIG. 15 shows a phase sensitive demodulation technique for the CIS control system.

Once the carrier positive sequence and the fundamental positive sequence currents have been filtered from the measured wound field synchronous machine currents, the remaining currents are carrier negative sequence plus various harmonics of both the fundamental and carrier. From the previously derived expressions for $\alpha\beta$ currents, the carrier negative sequence currents are given by:

$$i_{\alpha c 1 n} = \frac{V_c}{|Z_n|} \cdot \cos(2\theta_r - \omega_c t + \phi_n)$$

$$i_{\beta c 1 n} = \frac{V_c}{|Z_n|} \cdot \sin(2\theta_r - \omega_c t + \phi_n)$$

$$\phi_n = \tan^{-1}\{Im(Z_n)/Re(Z_n)\}$$

where the c1n appended to the $\alpha\beta$ subscripts signifies carrier, fundamental frequency, negative sequence. As can be seen the carrier negative sequence currents contain rotor position information in the phase angle relative to the negatively rotating carrier signal or carrier negative sequence reference frame. This information is extracted by means of phase sensitive demodulation. FIG. 15 shows a block diagram of a phase sensitive demodulation technique used in this CIS approach.

Transforming these currents into the carrier negative sequence reference frame with an $\alpha\beta$ to carrier negative sequence transformation block 68 using the following rotating transformation:

$$i_{dc1n} = \cos(\omega_c t) \cdot i_{\alpha c 1 n} - \sin(\omega_c t) \cdot i_{\beta c 1 n}$$

$$i_{qc1n} = \sin(\omega_c t) \cdot i_{\alpha c 1 n} + \cos(\omega_c t) \cdot i_{\beta c 1 n}$$

gives the following result:

$$i_{dc1n} = \frac{V_c}{|Z_n|} \cdot \cos(2\theta_r + \phi_n)$$

$$i_{qc1n} = \frac{V_c}{|Z_n|} \cdot \sin(2\theta_r + \phi_n)$$

Embedding this exact same equation form in what is called the saliency model allows estimating the carrier negative sequence currents. Estimated rotor position and estimated negative sequence impedance angle are inputs to a saliency model 70. The estimated unit amplitude carrier negative sequence currents are:

$$\hat{i}_{dc1n} = \cos(2\hat{\theta}_r + \hat{\phi}_n)$$

$$\hat{i}_{qc1n} = \sin(2\hat{\theta}_r + \hat{\phi}_n)$$

Forming the current vector cross product through a vector cross product block 72 yields the following error:

$$\text{error} = i_{qc1n} \cdot \hat{i}_{dc1n} - i_{dc1n} \cdot \hat{i}_{qc1n}$$

$$= \frac{V_c}{|Z_n|} \cdot \sin(2\theta_r - 2\hat{\theta}_r + \phi_n - \hat{\phi}_n)$$

This error is of exactly the correct form required to drive a phase lock loop or a rotor position observer 74 to produce the estimated rotor position and velocity. In the final algorithm configuration, the negative sequence carrier currents will be normalized to remove the amplitude dependence in the rotor position estimation control loop.

Once the error is formed, the rotor position observer 74 shown in FIG. 15 is used to obtain the estimate rotor position and velocity. Again, this rotor position is the for either the north or south pole. The true rotor position must be ascertained by other means.

N/S Determination

As explained above, the saliency induced negative sequence currents caused by the carrier potential injection can only provide an estimate of twice the rotor electrical angle, that is, it determines the position of a pole, any pole, and not necessarily the north pole needed for proper motor operation. In order to determine true rotor position, some means must be provided to discriminate north from south. This means exists in the field current rectification provided by the rotating rectifier in the field circuit. In essence this produces an asymmetry in the effective d-axis impedance as viewed from the stator. The d-axis looks different for the rotating rectifier forward biased than it does reverse biased. It turns out that field current rectification induces second and higher order harmonics in the d-axis currents for carrier injection. This asymmetry only exists for the wound field synchronous machine unexcited. As soon as it is excited, the rotating rectifier is forward biased, eliminating the asymmetry.

Considering only the second harmonics due to rectification of the carrier induced field currents, the dq stator currents are:

$$i_{d2} = I_2 \cdot \cos\{2(\omega_c t - \theta_r) - \phi\}$$

$$i_{q2} = 0$$

where $I_2$ and $\phi_2$ are the magnitude and phase of the second harmonic current. There is no second harmonic current in the q-axis since there is no q-axis field winding. Transforming these rotor synchronous reference frame currents to the 2-axis stationary ($\alpha\beta$) reference frame:

$$i_{\alpha c2} = I_2 \cdot \cos(\theta_r) \cdot \cos\{2(\omega_c t - \theta_r) - \phi_2\}$$

$$i_{\beta c2} = I_2 \cdot \sin(\theta_r) \cdot \cos\{2(\omega_c t - \theta_r) - \phi_2\}$$

Invoking the appropriate trigonometric identities for the sums and differences of angles yields:

$$i_{\alpha c2} = \frac{I_2}{2} \cdot \cos(2\omega_c t - \theta_r - \phi_2) + \frac{I_2}{2} \cdot \cos(3\theta_r - 2\omega_c t + \phi_2)$$

$$i_{\beta c2} = \frac{I_2}{2} \cdot \sin(2\omega_c t - \theta_r - \phi_2) + \frac{I_2}{2} \cdot \sin(3\theta_r - 2\omega_c t + \phi_2)$$

The c2 appended to the $\alpha\beta$ subscripts signifying carrier second harmonic. Much like the carrier fundamental currents, the carrier second harmonic currents are composed of a positively rotating component ($+2\omega_c t$) and a negatively rotating component ($-2\omega_c t$). Both components contain rotor position information, but the positive sequence component contains $\theta_r$ and not $3\theta_r$. The positive sequence component is the one used in the described approach to NS determination.

Figure 16:
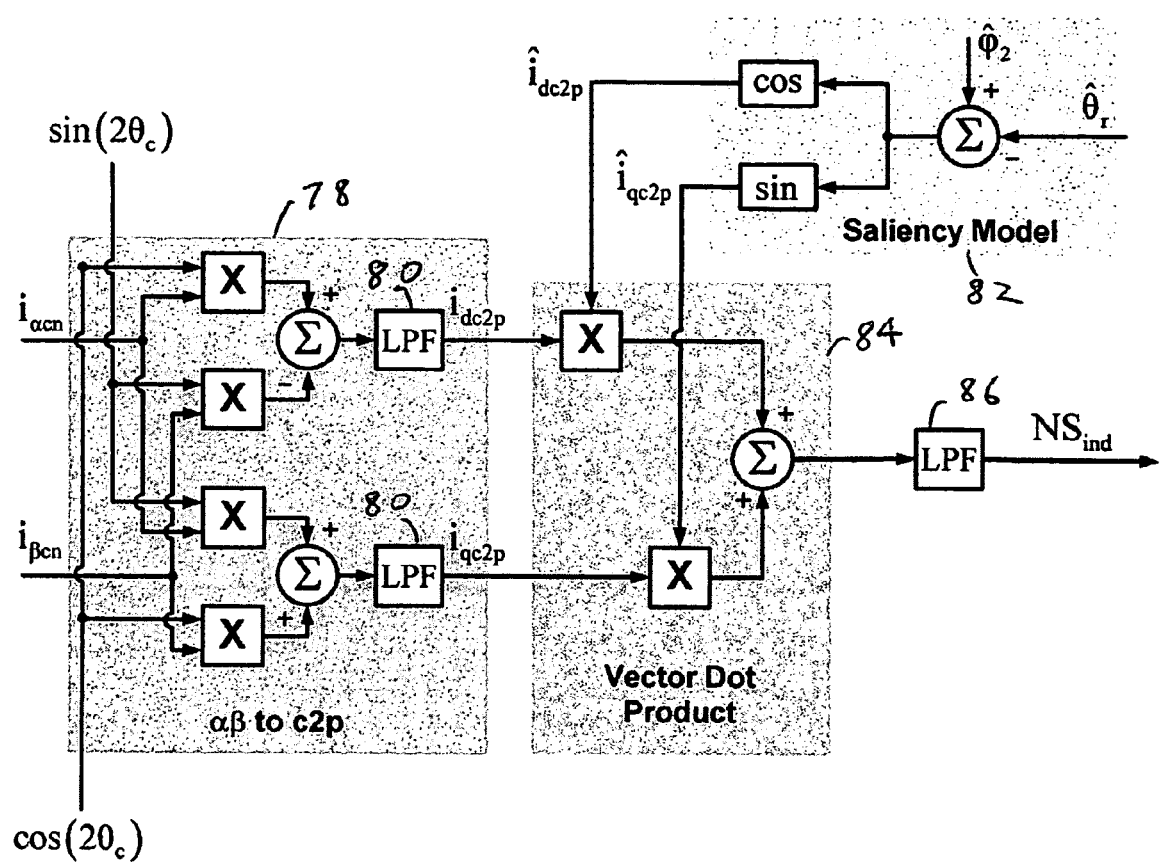
FIG. 16 shows a preferred implementation of a NS indicator for the CIS control system.

FIG. 16 shows a preferred implementation of a NS indicator 76 according to the invention. The carrier second harmonic currents are transformed into the carrier second harmonic positive reference frame by an $\alpha\beta$ to carrier second harmonic positive sequence transformation block 78 according to the following rotating transformation:

$$i_{dc2p} = \cos(2\omega_c t) \cdot i_{\alpha c2} + \sin(2\omega_c t) \cdot i_{\beta c2}$$

$$i_{qc2p} = \sin(2\omega_c t) \cdot i_{\alpha c2} + \cos(2\omega_c t) \cdot i_{\beta c2}$$

gives:

$$i_{dc2p} = \frac{I_2}{2} \cdot \cos(-\theta_r - \phi_2) + \frac{I_2}{2} \cdot \cos(3\theta_r - 4\omega_c t + \phi_2)$$

$$i_{qc2p} = \frac{I_2}{2} \cdot \sin(-\theta_r - \phi_2) + \frac{I_2}{2} \cdot \sin(3\theta_r - 4\omega_c t + \phi_2)$$

Low pass filtering with low pass filters 80 removes the second terms ($-4\omega_c t$) leaving:

$$i_{dc2p} \cong \frac{I_2}{2} \cdot \cos(-\theta_r - \phi_2)$$

$$i_{qc2p} \cong \frac{I_2}{2} \cdot \sin(-\theta_r - \phi_2)$$

The c2p appended to the dq subscripts designates carrier, second harmonic, positive sequence.

Following phase lock to a rotor pole using the phase sensitive demodulation technique described above in connection with FIG. 15, a saliency model 82 uses the estimated rotor position and second harmonic current phase to estimate unit amplitude carrier second harmonic positive sequence currents as:

$$\hat{i}_{dc2p} \cong \cos(-\hat{\theta}_r - \hat{\phi}_2)$$

$$\hat{i}_{qc2p} \cong \sin(-\hat{\theta}_r - \hat{\phi}_2)$$

The NS indicator can be defined as the current vector dot product:

$$NS = i_{dc2p} \cdot \hat{i}_{dc2p} + i_{qc2p} \cdot \hat{i}_{qc2n}$$

$$= \frac{I_2}{2} \cdot \cos(\theta_r - \hat{\theta}_r + \phi_2 - \hat{\phi}_2)$$

as performed by a vector dot product block 84.

Once the second harmonic phase has been determined (from analysis, refined by test) it will not vary significantly from unit to unit. In the final version of the algorithm the measured carrier second harmonic positive sequence currents will be normalized to remove current amplitude effects in the NS indicator. The NS indicator defined above is further low pass filtered by a low pass filter 86 to provide a steady signal for the NS determination logic. The important feature is that if the phase sensitive demodulation has locked on to a south pole, the estimated rotor position will differ from the true rotor position by 180° electrical, causing the NS indicator to be near −1. If a north pole is acquired, the estimated rotor position will be very nearly the true rotor position making the NS indicator nearly +1. Once the NS indicator has been determined, it is a simple matter to add (or subtract) 180° electrical to the estimated rotor position to arrive at the estimate of the true rotor position, that is, the estimated position of a north pole.

Start Sequence

Following initiation of a start of the machine 10, the following sequence of events is required for successful operation of the CIS sensorless approach with NS determination. This sequence along with some discussion of rationale and timing is as follows:

1. Inject carrier potentials and let the electromagnetic transients die away. Once the carrier potential waveform is applied it takes some time for ac steady state to be established. Something on the order of 0.25 second should be sufficient.
2. Activate rotor position observer and phase lock to a rotor pole. The initial estimated velocity and position are zero. Depending on whether or not the engine is windmilling and the final tuning and bandwidth of the rotor position observer, 0.5 second is adequate.
3. Establish N-S and correct the estimated angle. Once the observer has locked on to a rotor pole, this may take an additional 0.25 second.
4. Increase the carrier frequency using a controlled ramp. The best frequency for NS determination is not the best for estimating rotor position during wound field synchronous machine excitation and application of full torque producing currents. It is expected that the carrier frequency will be ramped up from about 100 Hz (for NS determination) up to the 500 Hz for reliable rotor position estimation while starting. The controlled ramp will require no more than 0.5 second to complete.
5. Activate the FOC power controller 22 at zero commanded torque. If the wound field synchronous machine is windmilling, applying excitation will produce generating currents that will perturb the CIS algorithm. The disturbance time frame is set by the wound field synchronous machine 10 dynamics and not selected for controls purposes. Activating the FOC power controller 22 at zero current command suppresses the fundamental generating currents. Allowing the FOC initialization transient to die away shouldn't take long, but 0.5 second represents a conservative estimate.
6. Apply excitation by activating the excitation source 12. Following excitation it takes some time for the electromagnetic transients to die away. At near rotor standstill, exciting the wound field synchronous machine 10 drives the machine 10 into saturation, which changes its impedances. A full second is allocated to allow all transients to completely die away before the next step is taken.
7. Command the FOC power controller 22 to full torque and accelerate the machine 10. The torque command from the FOC power controller is ramped up from zero to full torque using a controlled ramp with a rise time of 0.5 second. The torque command is ramped instead of stepped to avoid shocking the rotor position observer 74 and potentially causing it to lose phase lock with the rotor.

The suggested times for these seven steps are considered conservative. If these suggested times for the seven steps described above are summed, the total elapsed time before the full commanded torque is delivered is 4.0 seconds. Thus 4.0 seconds or less will be added to the theoretical start time due to the required CIS start sequence for NS pole determination.

Described above is a system for enhancing the performance of a CIS position sensing system for a wound field synchronous machine that utilises the positively rotating components $(+2\omega_c t)$ of the carrier second harmonic currents that contain rotor position information before field excitation to serve as a north-south pole indicator that determines if the CIS system has locked onto the north or south pole of the rotor. It should be understood that these embodiments of the invention are only illustrative implementations of the invention, that the various parts and arrangement thereof may be changed or substituted, and that the invention is only limited by the scope of the attached claims.

What is claimed is:

1. A north-south discriminator for discriminating between the north and south poles of a rotor for a polyphase alternating current (AC) wound field synchronous machine that has a power frequency representative of rotor angular velocity and current representative of torque and is driven by a control system that comprises a carrier injection sensorless (CIS) position sensing system that uses a polyphase AC carrier signal that has a frequency substantially higher than the power frequency applied to a stator of the machine whilst leaving the rotor unexcited, the rotor being excited by power generated by an exciter through a rotating rectifier, comprising:

a polyphase AC to two phase stationary transformation for transforming polyphase second harmonic components of the carrier frequency signal to a two phase stationary reference frame to produce carrier second harmonic positively rotating components and negatively rotating components;

a positive sequence carrier second harmonic transformation for transforming the carrier second harmonic rotating components into a positive sequence reference frame for the second harmonic of the carrier frequency; and a low pass filter for low pass filtering the transformed second harmonic components to generate north-south determination signal components representative of the position of the north pole of the rotor.

2. The north-south discriminator of claim 1, further comprising;

a saliency model for deriving estimated carrier second harmonic positive sequence components from estimated rotor position and carrier second harmonic phase; and a vector dot product to generate a north-south indicator signal from the vector dot product of the north-south determination signal components and the estimated carrier second harmonic positive sequence components.

3. The north-south discriminator of claim 2, wherein the north-south indicator signal is nearly −1 when the estimated rotor position differs from the true rotor position by 180° electrical and nearly +1 when the estimated rotor position is very nearly the true rotor position.

4. The north-south discriminator of claim 3, further comprising a low pass filter for filtering the north-south indicator signal.

5. A method of discriminating between the north and south poles of a rotor for a polyphase alternating current (AC) wound field synchronous machine that has a power frequency representative of rotor angular velocity and current representative of torque and is driven by a control system that comprises a carrier injection sensorless (CIS) position sensing system that uses a polyphase AC carrier signal that has a frequency substantially higher than the power frequency applied to a stator of the machine whilst leaving the rotor unexcited, the rotor being excited by power generated by an exciter through a rotating rectifier, comprising:

transforming polyphase second harmonic components of the carrier frequency signal to a two phase stationary reference frame to produce carrier second harmonic positively rotating components and negatively rotating components;

transforming the carrier second harmonic rotating components into a positive sequence reference frame for the second harmonic of the carrier frequency; and low pass filtering the transformed carrier second harmonic components to generate north-south determination signal components representative of the position of the north pole of the rotor.

6. The method of claim 5, further comprising the steps of:

deriving estimated carrier second harmonic positive sequence components from estimated rotor position and carrier second harmonic phase; and generating a north-south indicator signal from the vector dot product of the north-south determination signal components and the estimated carrier second harmonic positive sequence components.

7. The method of claim 6, wherein the north-south indicator signal is nearly −1 when the estimated rotor position differs from the true rotor position by 180° electrical and nearly +1 when the estimated rotor position is very nearly the true rotor position.

8. The method of claim 7, further comprising the step of filtering the north-south indicator signal.

9. A method of discriminating between the north and south poles of a rotor for a polyphase alternating current (AC) wound field synchronous machine driven by a control system that comprises a carrier injection sensorless (CIS) position sensing system, the rotor being excited by power generated by an exciter through a rotating rectifier, comprising the steps of:

generating polyphase AC power for the machine that has a power frequency representative of rotor angular velocity and current representative of torque;

generating a polyphase AC carrier signal that has a frequency substantially higher than the power frequency;

applying the AC power and carrier frequency signal to a stator of the machine whilst leaving the rotor unexcited;

detecting second harmonic components of the carrier frequency signal;

transforming the polyphase carrier second harmonic components to a two phase stationary reference frame to produce carrier second harmonic positively rotating components and negatively rotating components;

transforming the carrier second harmonic rotating components into a positive sequence reference frame for the second harmonic of the carrier frequency; and low pass filtering the transformed second harmonic components to generate a north-south determination signal components representative of the position of the north pole of the rotor.

10. The method of claim 9, further comprising the steps of:

deriving estimated carrier second harmonic positive sequence components from estimated rotor position and carrier second harmonic phase; and generating a north-south indicator signal from the vector dot product of the north-south determination signal components and the estimated carrier second harmonic positive sequence components.

11. The method of claim 10, wherein the north-south indicator signal is nearly −1 when the estimated rotor position differs from the true rotor position by 180° electrical and nearly +1 when the estimated rotor position is very nearly the true rotor position.

12. The method of claim 11, further comprising the step of filtering the north-south indicator signal.

* * * * *